United States Patent [19]

Jacobs et al.

[11] Patent Number: 5,054,888

[45] Date of Patent: Oct. 8, 1991

[54] METHODS OF MAKING COMPOSITE OPTICAL DEVICES EMPLOYING POLYMER LIQUID CRYSTAL

[75] Inventors: Stephen D. Jacobs, Pittsford; Kenneth L. Marshall, Henrietta; Kathleen A. Cerqua, Fairport, all of N.Y.

[73] Assignee: The University of Rochester, Rochester, N.Y.

[21] Appl. No.: 42,185

[22] Filed: Apr. 24, 1987

[51] Int. Cl.$^5$ ............................ G02F 1/13; C09K 19/52
[52] U.S. Cl. ............................................ 359/76; 428/1; 252/299.01; 252/299.4
[58] Field of Search ............... 252/299.01, 299.4; 350/340, 341, 351; 428/1

[56] References Cited

U.S. PATENT DOCUMENTS

| | | | |
|---|---|---|---|
| 4,293,435 | 10/1981 | Portugall et al. | 252/299.01 |
| 4,358,391 | 11/1982 | Finkelmann et al. | 252/299.01 |
| 4,560,594 | 12/1985 | Cobbs, Jr. | 428/1 |
| 4,624,872 | 11/1986 | Steutz et al. | 428/1 |
| 4,637,896 | 1/1987 | Shannon | 428/1 |
| 4,702,558 | 10/1987 | Coles et al. | 252/299.01 |
| 4,702,945 | 10/1987 | Etzbach et al. | 428/1 |
| 4,725,460 | 2/1988 | Matsuo et al. | 428/1 |
| 4,743,675 | 5/1988 | Watanabe | 428/1 |
| 4,762,912 | 8/1988 | Leslie et al. | 252/299.012 |
| 4,762,912 | 8/1988 | Leslie et al. | 252/299.01 |
| 4,807,968 | 2/1989 | Leslie | 252/299.01 |

FOREIGN PATENT DOCUMENTS 0089170 1/1986 European Pat. Off.

OTHER PUBLICATIONS

S. D. Jacobs, "Liquid Crystal Devices for Laser Systems", Journal of Fusion Energy, vol. 5, No. 1, p. 65 (1986).
S. D. Jacobs, "Liquid Crystals for Laser Applications", Chap. 2.5 Handbook of Laser Science and Technology, vol. IV, Optical Materials: Part 2, Ed. M. J. Weber, pp. 409 & 465 (1986).
H. Finkelman, Thermotropic Liquid Crystaline Polymers in Text Entitled Liquid Crystals of One-and-Two Dimensional Order (1980).
H. Finkelman, "Orientation of Nematic Liquid Crystaline Polymers in the Electric Field", Maknomol. Chem. 180, 803-806 (1979).
T. Tsutsui, "Solid Cholesteric Films for Optical Applications", Polymer 21, 351 (Dec. 1980).
Keller, Makromol, Chem. Rapid Comm. 6, 707-713 (1985).
"Improved Method of Adhesive Bonding by Use of Thermotropic Liquid Crystalline Polymers", Hovant, Eng., Industrial Opportunities LLE Review, vol. 24, Jul.-Sep., 1985, pp. 188-195.
Stephen D. Jacobs, SPIE, 307 Polarizers and Applications, pp. 98-105 (1981).
D. L. Miller and P. G. Newman, J. Vac. Sci. Technol. 19, 124 (May/Jun. 1981).

*Primary Examiner*—John S. Maples
*Assistant Examiner*—Richard Treanor
*Attorney, Agent, or Firm*—Martin Lukacher

[57] ABSTRACT

Composite optical devices using polymer liquid crystal materials both as optical and adhesive elements. The devices are made by assembling a heated polymer liquid crystal compound, while in a low viscosity form between optically transparent substrates. The molecules of the polymer are oriented, while in the liquid crystalline state and while above the glass transition temperature ($T_g$) of the polymer, to provide the desired optical effects, such as polarization, and selective reflection. The liquid crystal polymer cements the substrates together to form an assembly providing the composite optical device.

3 Claims, 3 Drawing Sheets

METHODS OF MAKING COMPOSITE OPTICAL DEVICES EMPLOYING POLYMER LIQUID CRYSTAL

The U.S. Government has rights in the invention under Cooperative Agreement No. DE-FC-080-85DP40200 between the University of Rochester and the U.S. Department of Energy.

DESCRIPTION

The present invention relates to methods of making composite optical devices employing polymer liquid crystals and methods of making such devices. More particularly, the invention relates to methods of making composite devices which utilize polymer liquid crystal elements both as optical and adhesive elements, which assemble and provide the optical properties of the composite device.

The invention is especially suitable for use wherever liquid crystals are applicable for use as one or more of the elements of a multi-element optical device, such as a polarizer, a polarizing beam splitter, an optical filter and an optical notch filter or apodizer.

The invention utilizes the polymer liquid crystal both as an optical element and as a principal means for assembling the composite device with other elements. These elements are referred to herein as transparent substrates. By transparent it is meant that the substrates are transparent to some portion of the optical spectrum in which the device is operative. This portion can be in the ultraviolet, visible, near-infrared or infrared portion of the optical spectrum.

Liquid crystal devices are classified as smectic, nematic and cholesteric. Cholesteric and smectic liquid crystals have a layered structure. The rotation of the molecules from layer to layer in cholesteric liquid crystals causes the direction of the long axis orientation within the material to trace a helical path through the material. The cholesterics therefore have chirality. The sense of the helical path may be opposite in different liquid crystals; either left-handed (LH) or right-handed (RH), depending upon the sense of the helical rotation (the helical screw sense) of the internal structure of the material. A survey of liquid crystals devices and their methods of preparation is contained in an article by Stephen D. Jacobs, entitled "Liquid Crystal Devices for Laser Systems", which appeared in the *Journal of Fusion Energy*, Vol. 5, No. 1, page 65 (1986); and "Liquid Crystals for Laser Applications", Chapter 2.5 in Handbook of Laser Science and Technology, Vol IV, Optical Materials: Part 2, Ed. M. J. Weber, pp 409–465 (1986). This latter reference has a listing of LH and RH cholesterics, melting temperature point and clearing temperature point data.

Liquid crystal polymers have been described in the literature. Siloxane copolymers which contain both cholesteric and nematic liquid crystal phases are available commercially from Consortium Fur Elektrochemische Industrie, GMBH, ZielstattstraBe 20 8000 Munchen 70, West Germany. Siloxane copolymers and others are described in an article by H. Finkelman, *Thermotropic Liquid Crystaline Polymers*, which appeared (at page 238) in the text, Liquid Crystals of One and Two Dimensional Order, published by Springer-Verlag, Berlin, Heidelberg, N.Y., (1980) and H Finkelman et al. "Orientation of Nematic Liquid Crystalline Polymers in the Electric Field", *Makromol. Chem*, 180, 803–806 (1979). The general structure of a siloxane copolymer is given below

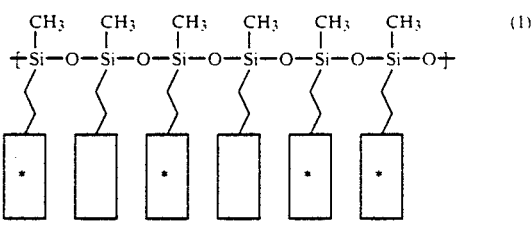

where the blocks indicated with a star are chiral mesogens of the structural formula

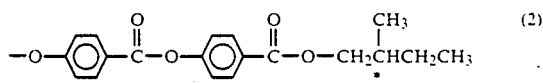

The blank boxes are nonchiral mesogens which are represented by the structural formula

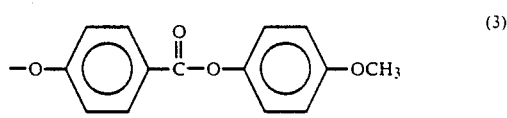

The zig-zag lines connecting the blocks to the siloxane polymer backbone are flexible hydrocarbon spacer groups of the general formula $-[CH_2]_n-$.

Other liquid crystal polymers which have been described in the literature are the polyglutamates which are lyotropic and possess a cholesteric phase. Such polymers are described in an article by T. Tsutsui et al. entitled "Solid Cholesteric Films for Optical Applications", Polymer, 21, 351 (December 1980). The polyglutamate polymer liquid crystal system is synthesized by free radical polymerization of PBuG and TGDM with benzophenone under ultraviolet radiation, as described in the Tsutsui et al. article referenced above. The synthesis method involves a mixing of the two materials shown below,

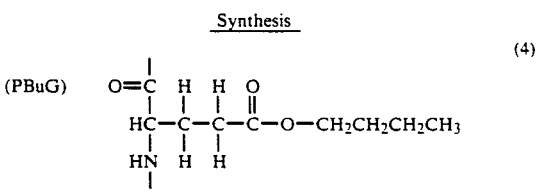

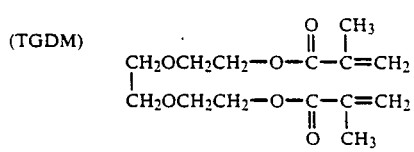

TGDM is the acronym for tryethylene glycol dimethacrylate.

Other liquid crystal polymers which have been described in the literature are the polymethacrylates which are both cholesteric and nematic (see Keller *Makromol. Chem. Rapid Comm.* 6, 707-713 (1985).

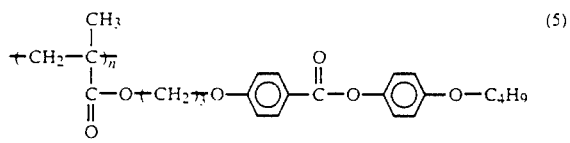

Liquid crystal polymers including those described above, may be used in providing the liquid crystal polymer elements in composite optical devices provided by the invention.

The liquid crystal materials which have been described in the literature are prepared and used in the form of film and foils as individual discrete elements. Liquid crystals have been mentioned as useful as glues or films which strap articles together in *European Patent Application Publication No.* 89170 of Sept. 9, 1983 entitled "Method for Forming Adhesive Bond and Liquid Crystal Adhesive". An article entitled "Improved Method of Adhesive Bonding by Use of Thermotropic Liquid Crystalline Polymers" appeared in a research disclosure by Havant, Eng., Industrial Opportunities. In this patent and in the article only the adhesive properties of the material are used and neither optical devices nor optical elements provided by the liquid crystal material are involved.

Previous composite optical devices have required the use of optical cements to attach the elements to each other. For example, optical filters have been made with plural birefringent elements and polarization sensitive retarders (waveplates), each of which must be cemented to the other. It has been found in accordance with the invention that composite optical devices can be made more simply and provided with improved optical properties, such as transmissivity and which are not adversely affected by the cement. Another feature of composite optical devices provided in accordance with the invention is that the polymeric liquid crystals are operable at higher temperatures than monomeric fluid liquid crystals and do not require seals to contain the material between substrates. The optical properties of the liquid crystal element may be formed in the course of device fabrication thereby providing a composite device having the desired optical properties which remain stable over a wide range of environmental conditions (e.g., to above 100° C.).

Briefly described, a composite optical device can be fabricated in accordance with the invention by assembling a polymer liquid crystal compound in its isotropic state between opposing surfaces of optically transparent substrate elements. The molecules of the polymer element are oriented while it is maintained in the liquid crystalline state (above the polymer's glass transition temperature, $T_g$) and is located between the substrate elements. The polymer material cements the substrate elements together to form the device. The assembly therefore can be fabricated in a simple manner. By orienting the molecules of the polymer liquid crystal material while the temperature is above $T_g$, the desired optical properties can be obtained. For example the amount of nematic birefringence is controlled by varying the thickness of the polymer element, while the polarization direction is determined by alignment of the molecules. Alignment can be provided by rubbing the substrate surfaces in desired directions or through the use of electric or magnetic fields having field vectors oriented in the directions which are desired.

The foregoing and other objects, features and advantages of the invention, as well as presently preferred embodiments thereof and the best modes now known for practicing the invention, will become more apparent from a reading of the following description in connection with the accompanying drawings.

Reference may also be had to the following U.S. patent applications describing liquid crystal optical devices which may be fabricated utilizing the invention: S. D. Jacobs, et al., Ser. No. 718678, filed Apr. 1, 1985, now U.S. Pat. No. 4,679,911, issued July 14, 1987 and S. D. Jacobs, et al., Ser. No. 692259 filed Jan. 17, 1985 now abandoned. The patent application Ser. No. 718678 relates to laser beam apodizers which may be fabricating utilizing the invention. Such apodizers are also the subject of an article published in the *LLE* Review, vol. 24, July–September 1985, pp. 188–195.

In the drawings: FIGS. 1A and 1B illustrate a polarizer in two stages of its fabrication;

Figures 5A, 5B:
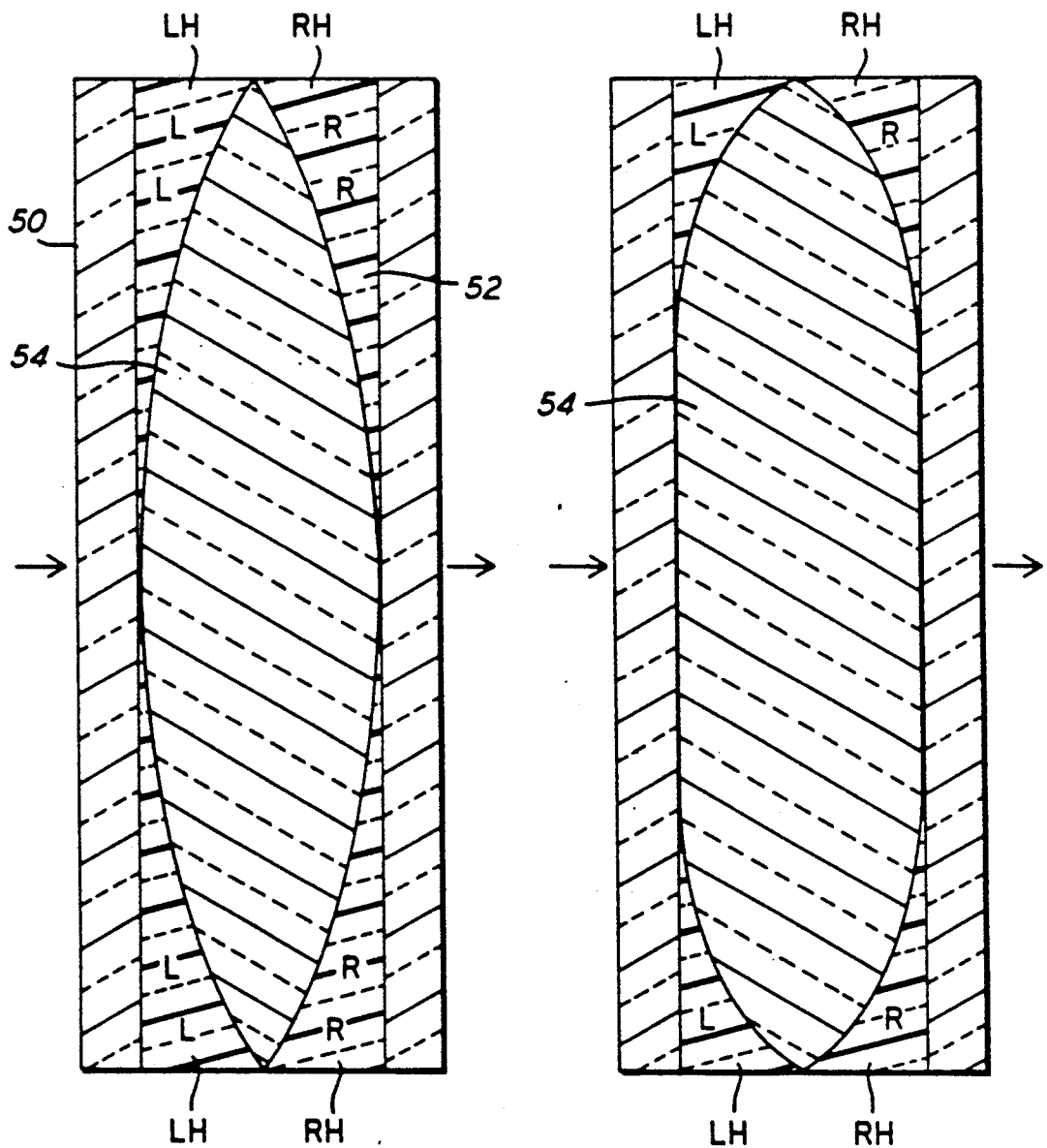

FIGS. 5A and B illustrate radial notch filters or apodizers.

All of these devices are composite devices which are provided in accordance with the invention.

Figure 1A:
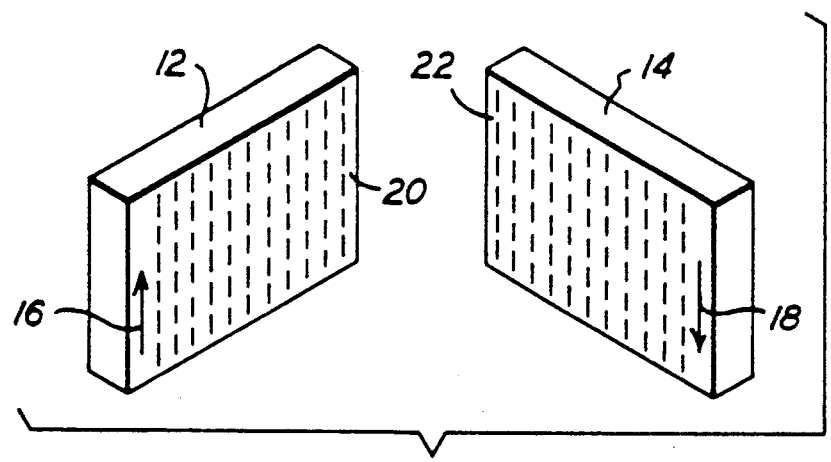
Figure 1B:
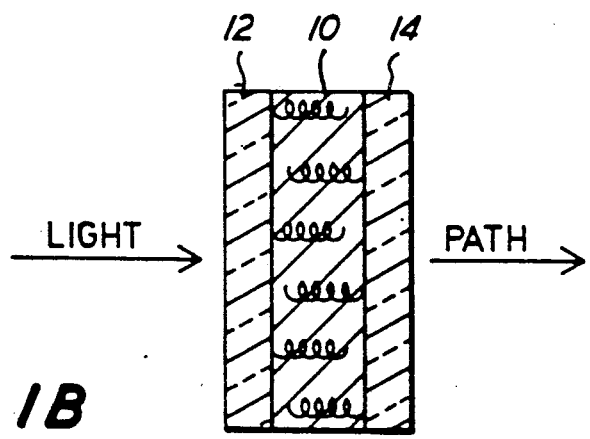

Referring to FIGS. 1A and 1B of the drawings there is shown a liquid crystal polarizer which may be used as a circular polarizer and as an isolator cell, if the liquid crystal polymer is cholesteric. FIG. 1B illustrates the completed device with a cholesteric liquid crystal element 10 sandwiched between two like transmitting substrate elements 12 and 14 in the form of plates. These plates may be disk shaped. The liquid crystal polymer element 10 cements the plates 12 and 14 together to provide the composite polarizer device. In the event that a waveplate is desired, the liquid crystal element 10 which is used will consist of nematic polymer liquid crystal molecules. The coil-like shapes superimposed over the sectioning in FIG. 1B illustrate the cholesteric nature of the element and Grandjean alignment. For further information on such alignment, see the article in the Journal of Fusion Energy, referenced above. Elliptical shapes superimposed over the sectioning indicate the nematic liquid crystal nature of the element. The operation of liquid crystal elements as polarizers and waveplates is described in the above identified article in the Journal of Fusion Energy and also in an article by Stephen D. Jacobs appearing in SPIE, 307-Polarizers and Applications, pp. 98–105 (1981).

The composite device may be manufactured as follows. The substrate elements are prepared so as to obtain the desired orientation of the liquid crystal molecules while the polymeric material is in its liquid crystalline state and above its $T_g$. This may be accomplished by rubbing or buffing the plates in opposite direction to scribe microscopic grooves therein for waveplate application. The direction of rubbing is indicated by the arrows 16 and 18. Rubbing is not necessary for circular polarizer devices, mechanical shear in assembly will be sufficient.

The plates embodiment are preferably of glass. However essentially all solid materials including glasses, crystals and plastics which are transparent may be used. These include BK-7 glass (the presently preferred glass), fused silica, calcite, mica, polycarbonate and acrylics.

In the case of a glass plate, the surface 20 of this substrate element 12 and the surface 22 of the substrate element 14 are preferably coated with polyvinyl alcohol and buffed with a felt roller. The substrate element may be placed on a table and a roller, similar to a paint roller rotated while being moved with respect to the element. An inclination of 45° of the nematic molecules with respect to the light polarization orientation is commonly used for quarter wavelength retardation to the phase of polarization of light which is incident on the device. These techniques are suitable mainly for fabrication of waveplates.

Another way of obtaining alignment of the molecules is by the deposition of a thin film at oblique incidence to the surfaces 20 and 22 on at least one of these surfaces. Nematic molecule alignment can also be accomplished using electric or magnetic fields while the polymeric material of the element 10 is still isotropic.

For example, polyglutamate polymers, PBug and TGDM (lyotropic) may be coated on at least one of the substrates, while the polymer is in the isotropic state, and the two substrates brought together. The thickness of the elements may be defined by spacers used during assembly. The thickness of the polymer liquid crystal element 10 controls the optical effect on the light which passes through the device as explained in the above referenced articles. When the device is assembled, the polymeric material cements the substrate elements 12 and 14 together therewith to provide the composite device. The assembled device is cured under ultraviolet radiation. The liquid crystal polymer element hardens and forms a permanent bond with the substrate elements 12 and 14.

In applying the liquid polymeric material to the substrate surfaces 20 or 22, the following method may be used with siloxane copolymer material, which as noted above is commercially available in powdered form. The powders are blended to achieve the desired optical effect. The blending may be done empirically; providing different amounts and testing each combination so that the cholesteric mixture exhibits a selective reflection peak at the desired wavelength. The cholesteric characteristic at the desired wavelength may be measured by varying the wavelength of light which is applied to the assembled elements. The peak reflection will be at the wavelength where the liquid crystal polymer exhibits a maximum in selective reflection.

After the powders are blended to obtain the selective reflection maximum at the desired wavelength, the substrate elements 12 and 14 are heated to a temperature above which the powders will melt. For commercial siloxane copolymer material, a suitable temperature is 90° C. The blended material is then applied to the heated substrate surface. The material can be applied to either one of the surfaces 20 or 22 and allowed to melt. Then the hot substrates are assembled into a cell as shown in FIG. 1B. Spacers may be used to fix the thickness of the polymer layer between the surfaces 20 and 22. The assembled cell is then allowed to cool at room temperature until the polymer cools below $T_g$, at which time the substrates are rigidly attached by the polymer liquid crystal layer. While cooling, mechanical shear on the liquid crystal may be applied by moving the glass plates with respect to each other.

Another method of applying the polymer is to dissolve the blended powders in a solvent, such as toluene. The toluene solution is applied to the substrate surface (either surface 20 of the substrate 12 or surface 22 of the substrate 14). The surface may be dipped into the solution. Spin or bar coating may be used. The application of the liquid polymeric solution is done at room temperature. The solvent is then allowed to evaporate at room temperature. The uncoated substrate is then assembled with the coated substrate and heat is applied to raise the temperature of the device above the polymer's glass transition temperature, $T_g$. The liquid crystal polymer then flows to fill the gap, defined by spacers, for example, between the surfaces 20 and 22. Then the device is allowed to cool below $T_g$, which rigidly bonds the substrates and liquid crystal.

The following contain specific examples of the fabrication method.

Step 1

A liquid crystal (hereinafter referred to as LC) polymer, in the form of a crystalline powder or an extremely high viscosity "blob" of polymeric material is heated. The glass substrates are also heated. The heating is to 40°–150° C. Upon heating, the powder melts into a low viscosity polymer mass which is in its liquid crystalline phase in this temperature regime. The "blob" softens and flows as it is heated above its glass transition, $T_g$, and its viscosity drops by several orders of magnitude. Several examples of $T_g$, $T_c$ and $\lambda_{peak}$ for LC-siloxanes commercially available are listed in the table below. $T_c$ is the clearing point temperature where the material goes isotropic.

TABLE 1

Left-Handed LC-Siloxanes
Source - Consortium for Elektrochemische Industrie GMBH

| LLE ID # | Lot No. | Room Temp. Form* | $T_g$(°C.) | $T_c$(°C.) | $\lambda_{Peak}$ (nm) |
|---|---|---|---|---|---|
| 1306 LC-45120 | W 2535 | PC | 48 | 173 | 1170 |
| 1307 LC-4576 | W 2647 | PC | 51 | 178 | 760 |
| 1308 LC-4474 | G 1377 | PC | 49 | 170 | 738 |
| 1309 LC-3861 | G 1571 | B | 17 | 107 | 614 |
| 1310 LC-4951 | G 1365 | PC | 57 | 218 | 510 |
| 1311 LC-4845 | G 1553 | PC | 53 | 209 | 450 |
| 1312 LC-3839 | L 612 | B | 36 | 110 | 393 |

*PC = polycrystalline powder
B = very viscous blob

Even if homogenization of the starting compounds is not done, it is useful for some materials to heat them to their isotropic phases (no liquid crystal phase as explained below) prior to further processing. There are now three temperature alternatives to the assembly of glass substrate sandwich structures using the LC polymer cement. They are summarized below:

| Condition | Assembly Temperature LC Polymer | Substrates |
|---|---|---|
| (1) | $T > T_c$ | $T > T_c$ |
| (2) | $T > T_c$ | $T < T_c$ |
| (3) | $T_g << T < T_c$ | $T < T_c$ |

Best results occur using condition (3). It will be more apparent as the description proceeds that the cooling rate for assembled cells, and the timing and duration of mechanical shearing which is useful, but not always necessary, to create a Grandjean textural alignment, are controlled carefully to enhance the optical quality of resulting cemented components.

Step 2

To adjust the wavelength for selective reflection of the polymer LC, if the selective reflection peak is not at the wavelength of interest, a low molecular weight cholesteric or nematic is added to the heated polymer. Alternatively two polymers with different $\lambda_p$'s are blended. For blending, the polymer LC is heated above its clearing point $T_c$, which may be anywhere from 80° C. to 225° C. At $T>T_c$ the polymer goes isotropic (i.e. no liquid crystal phase) and homogenous blending is most easily accomplished. A magnetic stir bar on a hot plate may be used for this purpose. Long term heating and stirring has the added advantage of driving off any remaining solvents from previous synthesis stages, which might cause bubble formation in subsequent processing steps.

Step 3

The heated LC polymer material next is applied to the heated substrate and the device assembled. The following steps may be alternatively used.

a) Plop and Drop—one can apply a blob of LC polymer "cement" to the center of one substrate, and then lower the other substrate down onto the first. The two substrates are then pressed together to squeeze out the cement. This process is conducted with substrates and LC polymer at $T_g<<T<T_c$. Polyester Mylar spacers (Dupont), vacuum deposited thin film coating tab spacers, glass fiber spacers, or no spacers may be employed. A cement layer 3 μm–10 μm thick is sufficient, and usually results from this technique without spacers, due to the relatively high viscosity of the LC polymers. Mechanical shearing, as noted above, is done to align the LC polymer during cooling. This assembly process would be appropriate for any optical device requiring 2 or more substrates (polarizing beam splitter, polarizer, isolator, notch filter, apodizer as discussed below).

b) Bar Coating—A wire wound bar is used to spread a reasonably even polymer layer onto a substrate surface. A commercially available bar coater set may be used, for example, from RK Print—Coat Instruments, Ltd., South View Laboratories, Litlington, Royston, Hertz., SG8 OQZ Kerchiss, Cambridge, England. They consist of a set of individual rods. Each rod has a specific gauge of wire wrapped around it. The finer the wire size, the thinner the film layer which is created when the bar is used to draw material across the substrate. The substrate, polymer and bar must be heated to $T_g<<T<T_c$. The resulting film often has striations. A sandwich may now be formed by contacting a second substrate to the first. Bar coating is not preferred, since entrapped bubbles may result.

(c) Spin Coating—A spin coater may used (see D. L. Miller and P. G. Newman, J. Vac. Sci. Technol. 19, 124 (May/June 1981). The polymer, dissolved in a suitable solvent, is applied to the substrate until the whole substrate surface is covered. One then spins the substrate at a fixed RPM to spread out the polymer into a uniform film with constant thickness. The final thickness is determined by the viscosity at $T_g<T<T_c$ of the LC polymer and the RPM. Contact is made to the second substrate. The assembly may be reheated to remove solvent and soften the LC cement.

(d) Capillary Action—The substrate elements to be cemented may be assembled and clamped together, then heated on a hot-plate. LC polymer material is placed at the air gap between the substrates at $T_g<<T<T_c$. Capillary action will cause the polymer to be sucked into the air gap. Mechanical shearing may then be performed.

Figure 2:
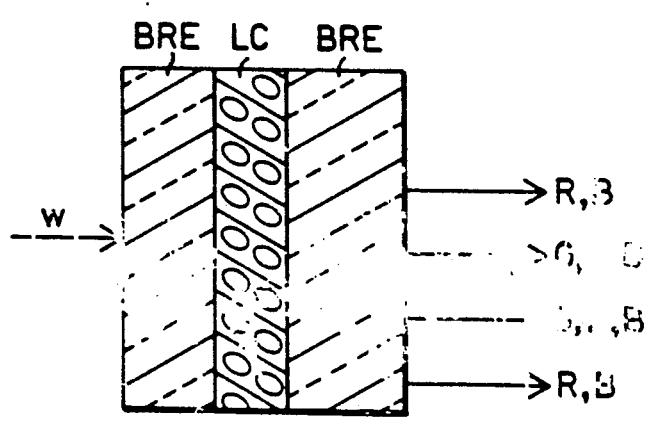
FIG. 2 illustrates a selective color filter.

Referring to FIG. 2 there is shown a selective color filter where the liquid crystal element LC is sandwiched between two birefringent substrate elements (BRE) which may be any transparent doubly refracting material such as calcite or quartz. The device shown in FIG. 2 may be made in the same manner as the device shown in FIG. 1B and in accordance with the foregoing example. Because of polarization effects, incoming white light is split into magenta rays (R,B) and rays which are substantially in the green (G,R,B), as shown in the drawing.

Figure 3:
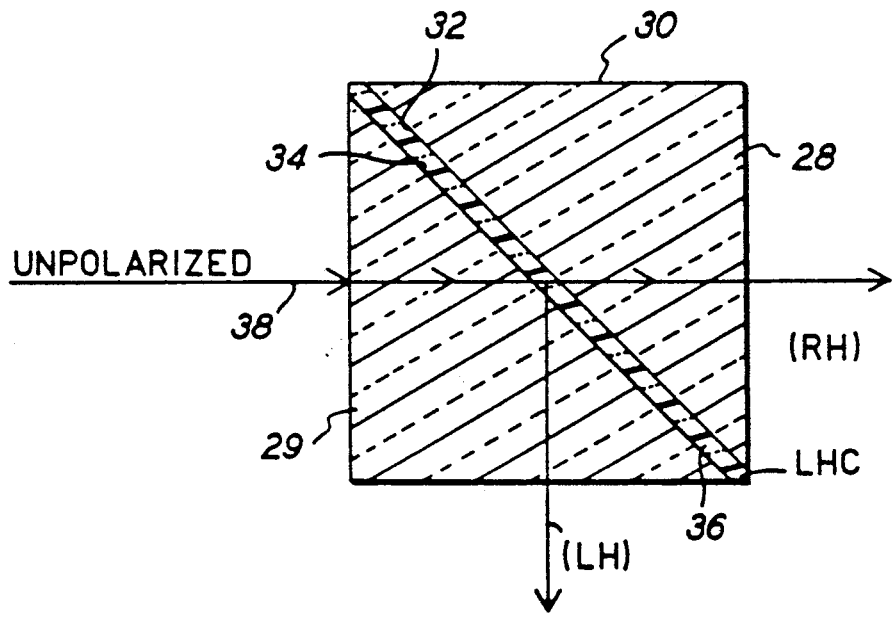
FIG. 3 illustrates a polarizing beam splitter.

FIG. 3 shows a polarizing beam splitter in the form of a cube 30 made of two right prisms. The hypotenuse surfaces 32 and 34 of these prisms 28 and 29 have a cholesteric liquid crystal polymer element 36 with left-handed chirality (LHC). The beam splitter splits incident light, laser radiation at the wavelength to which the element 36 is tuned into orthogonal polarization components which are right-handed and left-handed polarizations (RH and LH). The cholesteric direction is left-handed in the element 36. The angle of incidence to the surface 34 of the incoming laster beam 38 is 45°. Other angles may be used with rectangular shapes formed by prisms 28 and 29. The thickness and refractive index at the wavelength of the incident laser beam is selected in accordance with the following formula:

$$\lambda = \lambda_0 \left[ \sin^{-1}\left( \frac{1}{n_n} \sin \theta \right) \right]. \tag{6}$$

Where $\lambda$ is the wave of the incident radiation, $\lambda_o$ is the product of the average refractive index of the liquid crystal polymer element 36 and the pitch of the cholesteric which is the length of a stack of layers of molecules for a rotation of the molecules from the first to the last layer in the stack of 360°. For further information respecting the pitch, reference may be had to the above identified SPIE article. In the formula, $n_n$ is the average retractive index and $\theta$ is the angle of incidence of the input beam 38 to the surface 34.

The polarizing beam splitter can be manufactured more simply and at cost-advantage over polarizing beam splitters which rely upon multilayer dielectric coating on hypotenuse surfaces of right angle prisms and which must be cemented together with optical cement.

Figure 4:
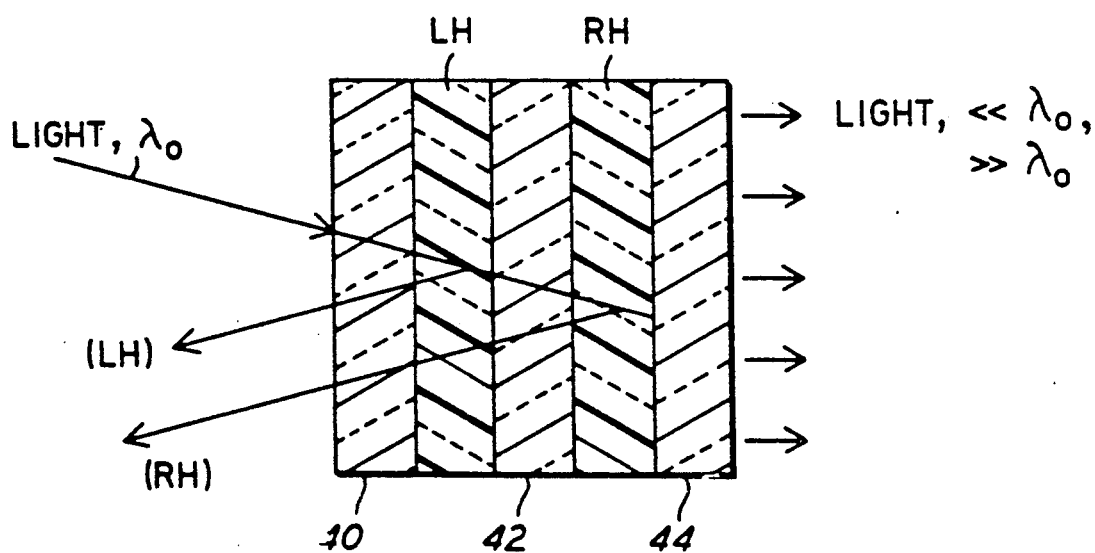
FIG. 4 illustrates a selective reflection notch filter.

Referring to FIG. 4 there is shown a notch filter having first and second substrate elements 40 and 42 similar to the elements 12 and 14 and a third substrate element 44. This third element may be similar to the elements 40 and 42. Between the first and second substrates 40 and 42 there is disposed a left-handed (LH) chirality polymer liquid crystal element. A right-handed chirality cholesteric liquid crystal polymer element (RH) is located between the second and third substrates 42 and 44. The notch filter device reflects both left-handed and right handed polarization components and transmits light which is of wavelength much less than and much greater than the wavelength of the incident light. The adhesive properties of the liquid crystal polymer elements simplify the assembly of the notch filter device. The substrate elements 40, 42 and 44 may be of polycarbonate material.

Referring to FIGS. 5A and B there are shown radial notch filters having transparent substrate plates 50 and 52 and a central plate 54 which is elliptical and which may be spherical to form a biconvex lens in cross-section in FIG. 5A and flattened in FIG. 5B. LH and RH polymer liquid crystal elements similar to those used in FIG. 4 cement the device together.

A polarizer may be provided in the form of the device shown in FIG. 1B where the last substrate 14 in the path is a quarter wave plate made of crystal such as quartz. The product of its thickness and index selected to be a quarter wavelength at the wavelength of incident unpolarized light. The optical axis of the waveplate substrate 14 in perpendicular to the incident beam (light path) and may be in the plane of the paper on which the drawing appears. The output light is linearly polarized. The polymer may be a LH, LC polymer.

The advantages of this polarizer is that it can be used at or near normal incidence, high transmission (low absorption, broad wavelength range, and operating temperature range (T greater than 100° C.).

A crossed polarizer pair may use the above described polarizer in tandem with a device of similar construction, but with the substrate 12 on which the linearly polarized light from the polarizer incident a quarter wavelength waveplate with its optical axis perpendicular to the optical axis of the waveplate in the polarizer. Then the linearly polarized light will be blocked and no output light will appear.

We claim:

1. The method of making a composite optical device which comprises placing a polymer liquid crystal compound in a liquid state between opposing surfaces of optically transparent substrate elements, then orienting the molecules of the polymer while in its liquid crystal state and at a temperature above the polymers plass transition temperature ($T_g$) between the substrate elements, and cementing said substrate elements together with said polymer liquid crystal as it solidifies from the liquid state after said orienting step to form the composite optical device, and wherein said orienting step is carried out by rubbing said surfaces of said substrates.

2. The method according to claim 1 wherein said surfaces are rubbed at angles at oblique incidence to perpendiculars to said surfaces.

3. The method of making composite optical device which comprises placing a polymer liquid crystal compound in a liquid state between opposing surfaces of optically transparent substrate elements, then orienting the molecules of the polymer while in its liquid crystal state and at a temperature above the polymers glass transition temperature ($T_g$) between the substrate elements, and cementing said substrate elements together with said polymer liquid crystal as it solidifies from the liquid state after said orienting step to form the composite optical device, and wherein said orienting step is carried out by applying mechanical shear to said polymer liquid crystal.

* * * * *